March 17, 1970     KARL-HEINZ LIEBERT     3,500,756
PUMP OR HYDRAULIC MOTOR CONSTRUCTION, ESPECIALLY
FOR BOOSTER STEERING Filed Aug. 12, 1968     4 Sheets-Sheet 4

INVENTOR:
K.H. Liebert
ATTORNEY:

United States Patent Office 3,500,756
Patented Mar. 17, 1970

3,500,756
PUMP OR HYDRAULIC MOTOR CONSTRUCTION, ESPECIALLY FOR BOOSTER STEERING
Karl-Heinz Liebert, Fuggerle, Germany, assignor to Zahnradfabrik Friedrichshafen, Aktiengesellschaft, Friedrichshafen, Germany, a corporation of Germany
Filed Aug. 12, 1968, Ser. No. 751,769
Claims priority, application Germany, Aug. 19, 1967, Z 12,999
Int. Cl. F04c *17/06;* F15b *15/18;* B62d *5/00*
U.S. Cl. 103—126                                       8 Claims

ABSTRACT OF THE DISCLOSURE

The invention is for a hydraulic pump or motor construction particularly for use in combination with a steering spindle and operated as a pump wherein a pinion is rotated by the spindle and having a universal joint coupling therewith so that it has a nutatory motion as it rolls in engagement with a fixed internal gear. The pinion is universally coupled to a crank, i.e., an eccentric, which is rotated as the steering spindle is rotated, to rotate the rotor of a positive displacement metering pump for effecting pressure to actuate a valve. The valve controls fluid pressure from a main pump to a booster cylinder for power steering. The gearing described affords a step up in rotational speed of the metering pump whereby a large volume discharge is realized.

---

Broadly, the combination of a metering pump and a main pump in a booster steering system is shown in previously filed U.S. patent applications of Armin Lang, S.N. 673,757, filed Oct. 9, 1967 and Karl-Heinz Liebert, S.N. 698,625, filed Jan. 17, 1968; both assigned to the present assignee. However, such systems were relatively complex, requiring valving not needed in the present invention which represents a simplification and a general improvement in construction, performance, and economy.

As a general proposition the systems which utilize combinations of metering and main pumps are so devised that in the event of failure of the main pump, the metering pump can provide booster pressure to achieve a substantial steering aid to the driver. Also, in such systems, the metering pump pressure is added to the main pump pressure in normal operation to augment overall pressure.

In the presnt invention a double ended piston operated spool valve is controlled by the metering pump e.g., a multi-way valve as shown in the U.S. patent to J. R. Lemon, 2,020,951, issued Nov. 12, 1935. In that patent, however, the metering pump is relatively low volume discharge, being of conventional design. The metering pump disclosed herein is of a construction wherein for compactness and simplicity the components are coaxial, for example, as shown in the U.S. patent to Dettloff et al., 3,087,436, issued Apr. 30, 1963.

In the latter patent the drive ratio between the input shaft and the pump rotor is 1:1 and accordingly relatively low volume discharge is effected. The invention herein provides an increased ratio by providing a novel universally mounted pinion keyed to the steering spindle and having an axis at an angle to the spindle axis and rotating about the spindle axis to generate a cone. The pinion teeth are in constant mesh with a fixed internal gear coaxial with the spindle axis, and such pinion is made suitably conical, i.e., in a manner similar to a bevel gear so that as the pinion nutates about the spindle axis the teeth come into proper flank to flank engagement with the teeth in the internal gear. Housed within the pinion is a crank member, viz., an eccentric rotational about the spindle axis and mounted on a shaft one end of which has bearing support in the spindle axis, the rotor of the metering pump being keyed to such shaft.

Figure 1:
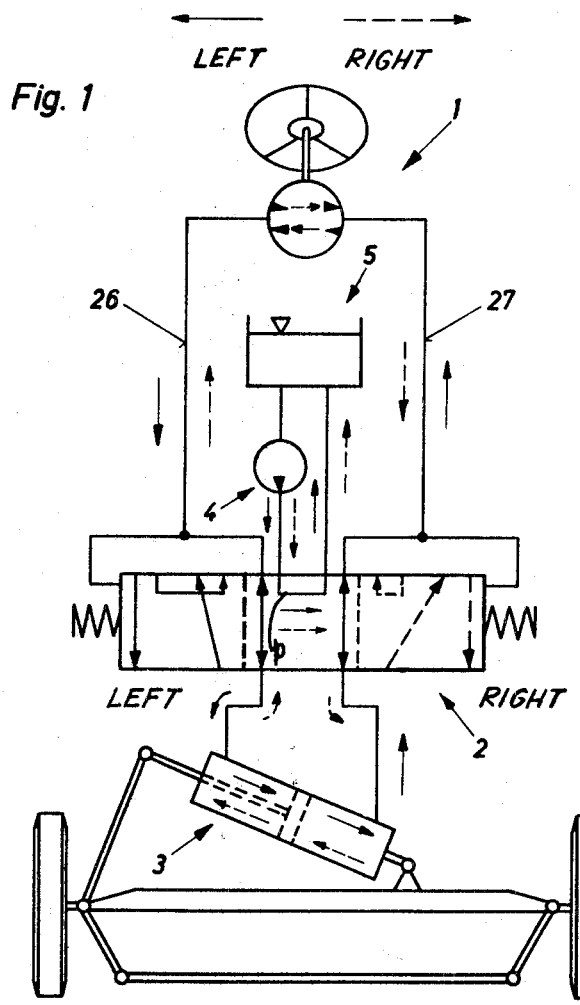
Figure 2:
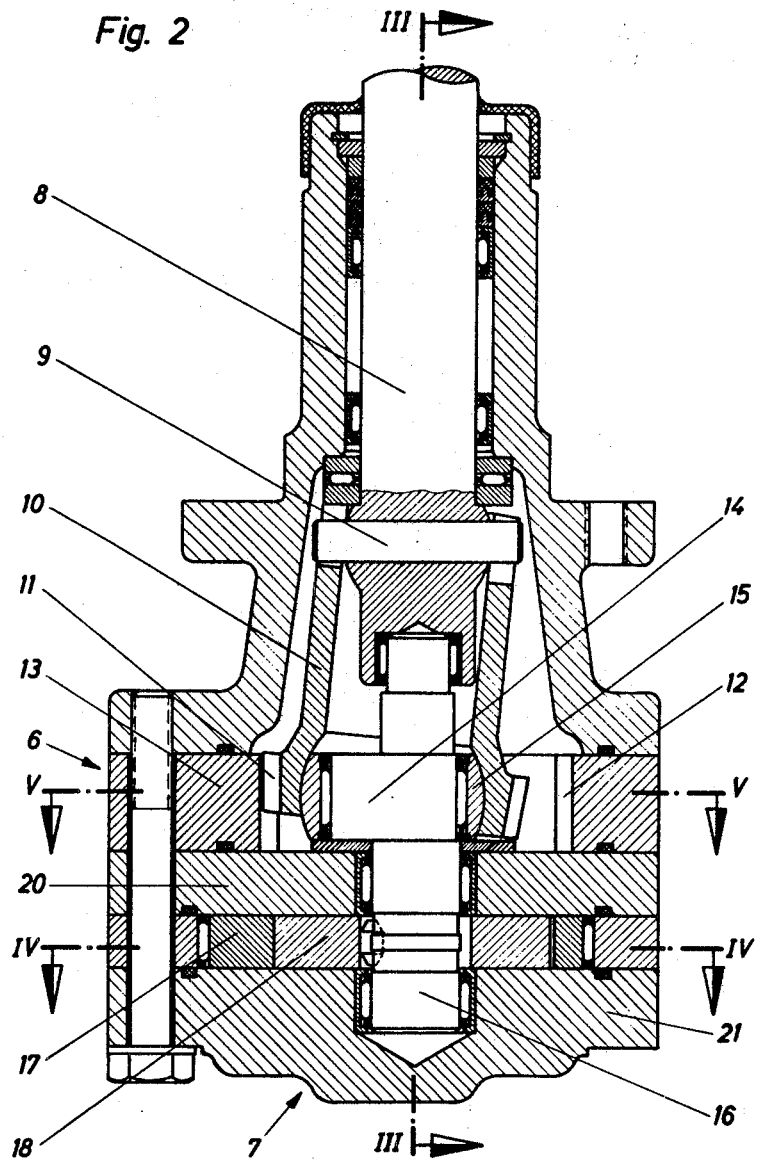
Figure 3:
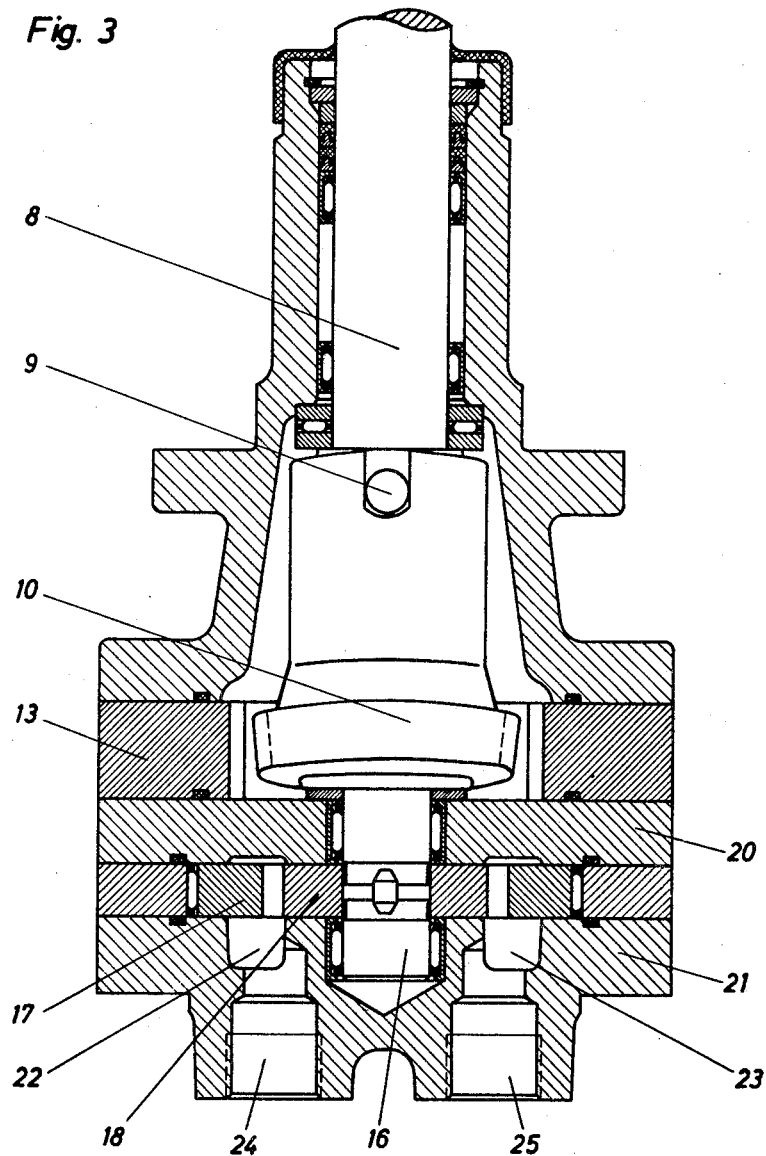
Figure 5:
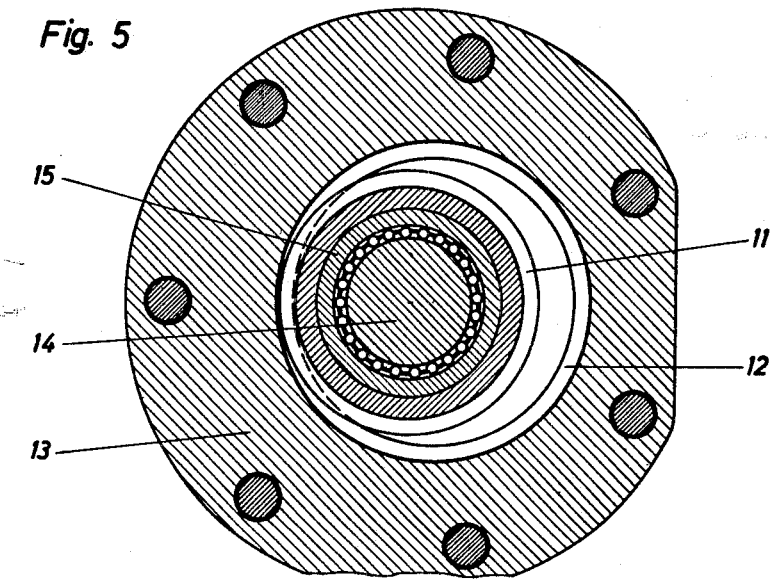
Figure 4:
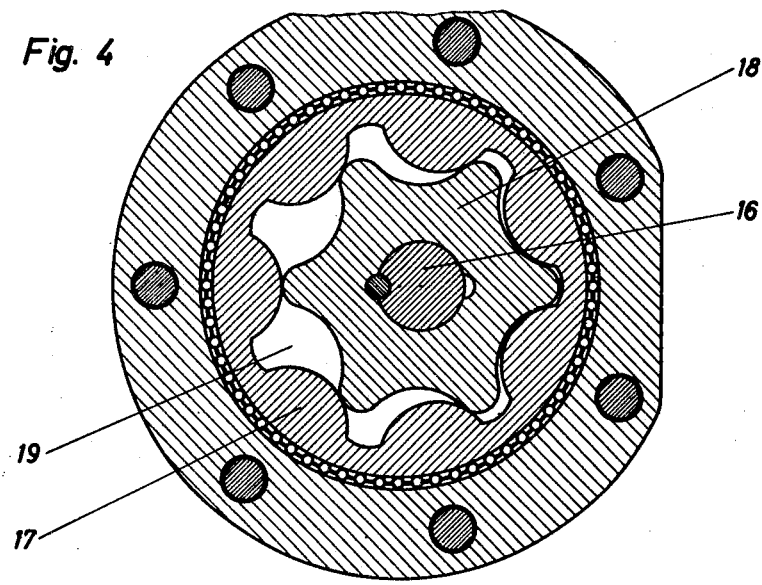

A detailed description of the invention now follows, in conjunction with the appended drawing, in which:

FIG. 1 is a symbolic diagram of the overall booster system;
FIG. 2 is a cross sectional elevation of the construction of the invention;
FIG. 3 is a section through III—III of FIG. 2;
FIG. 4 is a section through IV—IV of FIG. 2; and
FIG. 5 is a section through V—V of FIG. 2.

Referring to FIG. 1, the basic elements of the system comprise a steering wheel and spindle and the metering pump construction all designated by reference numeral 1, in conjunction with a reciprocal spool multi-way valve 2 operated via pressure lines 26 and 27 for controlling flow from main pump 4, having reservoir 5, to and from the ends of a hydraulic servomotor 3 which effects steering.

The combination described is not novel and is not claimed herein, it being understood that valve 2 may be designed in accordance with routine engineering principles for its particular function of being shiftable reversibly against spring bias at each end by pressure coming in from the metering through either line 26 or 27, one line providing outlet pressure while the other effects intake flow. The hydraulic circuitry is such that the metering pump pressure augments the main pump pressure or can serve as the booster pressure in the event of failure of the main pump.

In FIG. 1, valve 2 is shown in neutral position, flow bypassing through passage *p* from pump to reservoir. The solid arrows indicate flow paths for left hand steering and the dashed arrows indicate right hand steering. In addition to the patent to Lemon, previously mentioned, other patents showing the valve type are Marquart 3,354,729 and Pruvot 3,218,805.

Referring to FIGS. 2–5, the novel construction of the invention comprises a steering spindle 8 coupled by a cross pin to a pinion 10 formed with pinion teeth 11 in constant mesh with teeth 12 of a fixed internal gear 13 secured as by bolts in housing 6. The pinion has an integral sleeve, as shown, slotted to accommodate the ends of driving pin 9. The spindle is formed with a spherical end between the sleeve slots to provide universally movable support to the pinion such that the pinion has a nutatory motion upon rotation of the spindle. The pinion axis is restrained to a conical path by the coupling with the spindle and the further universal joint coupling via spherical bearing 15 carried on an eccentric disc 14, serving as a crank and secured to a driven shaft 16 coaxial with the spindle. The upper end of shaft 16 has coaxial bearing support in a socket in the end of the spindle, as shown, and the lower end has similar coaxial bearing support in the housing end plate 21, as shown. The plate 21 is a cheek plate of metering pump 7, the other cheek plate being the plate 20.

The pinion teeth 11 are set at a slant on a conical surface of revolution so as to maintain straight flank alignment with teeth 12 when the spindle is rotated, the pinion rotating with the spindle and rolling within the internal gear 13. Such motion of the pinion in one direction causes eccentric 14 to effect a cranking action by rotation about the axis of shaft 16, rotating that shaft in a direction opposite to the spindle rotation and at a speed determined by the ratio of pinion to internal gear teeth.

Thus, the ratio step up is in accordance with the relationship:

$$R = \frac{\text{Number of teeth of pinion}}{\text{Difference between number of teeth of internal gear and pinion}}$$

and, for example, if the pinion has 24 teeth while the gear has 28 teeth the shaft 16 will rotate 6× faster than spindle 8.

Accordingly, a large discharge can be effected for the metering pump 7 for a small rotation of the spindle since the rotor 18 of the pump is keyed to shaft 16 which coacts with outer pump member or stator 17, rotatably mounted, and of conventional construction, the rotor having one less tooth than the outer ring and effecting pumping chambers 19 as it rotates.

The cheek plate 21 is provided with chambers 22, 23 which serve either as inlet or outlet chambers depending on the direction of rotation of rotor 18 in a well understood manner, connecting to lines 26, 27 via bores 24, 25.

It will be noted that the construction requires no rotational sleeve valving as used in the previously mentioned patent applications and also as used in the Dettloff et al. patents. Further, the mounting of the metering pump rotor on shaft 16 instead of being supported by the outer pump ring produces an improved rolling engagement between these components by minimizing play therebetween.

The construction described can also be used as a hydraulic motor, the spindle then being a mechanical power output shaft. In such case the gear ratio of the mechanism will provide a substantially increased torque over the torque effected on the rotor by incoming pressure fluid.

It will thus be apparent that the invention effects a compact, rugged and economical pump or motor having a simple and unique construction as described in the claims. The claims that follow use generic terminology so as to protect the construction whether used as a pump or motor, and accordingly it will be understood that a term such as "shaft" can refer either to a power input shaft, when the device is used as a pump, e.g., a steering spindle, or a power output shaft for providing mechanical shaft power.

I claim:

1. A hydraulic device usable as a pump or motor: comprising a first shaft, a pinion gear universally coupled to said shaft; a fixed internal gear; said pinion gear being disposed therein and in mesh therewith; a second shaft having a universal coupling crank connection with said pinion gear and being axially alined with said first shaft; a rotor keyed to said second shaft; a stator meshing with said rotor; housing means enclosing said rotor and stator and having chamber and port means for effecting an inlet and outlet for fluid conduction; whereby said pinion gear has a nutatory motion when said rotor is in rotation and wherein said pinion gear and said internal gear effect a step up or step down drive ratio depending on whether said device is used for a pump or motor.

2. A hydraulic device as set forth in claim 1, a spherical bearing at the end of said first shaft, said pinion gear having a sleeve and said spherical bearing being disposed within said sleeve whereby said pinion gear is universally coupled to said first shaft; said sleeve having slot means and said shaft having a pin disposed in said slot means for effecting rotative connection between said pinion gear and said first shaft.

3. A hydraulic device as set forth in claim 1, means effecting bearing support for said first shaft, said second shaft having an end provided with bearing support by an end of said first shaft.

4. A hydraulic device as set forth in claim 1, said housing means enclosing said rotor and stator comprising a cheek plate, said second shaft having bearing support in said cheek plate.

5. A hydraulic device as set forth in claim 1, said pinion gear having a sleeve and said second shaft passing through the sleeve of said pinion gear.

6. A hydraulic device as set forth in claim 1, means effecting bearing support for said first shaft; said second shaft having an end provided with bearing support by an end of said first shaft, said housing means enclosing said rotor and stator comprising a cheek plate, said second shaft having bearing support in said cheek plate.

7. A hydraulic device as set forth in claim 1, means effecting bearing support for said first shaft; said second shaft having an end provided with bearing support by an end of said first shaft, said housing means enclosing said rotor and stator comprising a cheek plate, said second shaft having bearing support in said cheek plate; said pinion gear having a sleeve and said second shaft passing through the sleeve of said pinion gear.

8. A hydraulic device as set forth in claim 1, said first shaft comprising a vehicle steering spindle whereby rotation of said spindle by a vehicle operator effects a metering pump discharge from said rotor and stator to control a booster steering system.

References Cited
UNITED STATES PATENTS

| | | | |
|---|---|---|---|
| 725,615 | 4/1903 | Cooley. | 91—68 |
| 3,139,835 | 7/1964 | Wilkinson. | |
| 3,289,542 | 12/1966 | Fikse | 91—56 |
| 3,348,493 | 10/1967 | Easton | 103—130 |
| 3,405,603 | 10/1968 | Woodling | 91—56 |
| 3,452,543 | 7/1969 | Goff et al. | 180—79.2 |
| 3,452,680 | 7/1969 | White | 103—130 |

DONLEY J. STOCKING, Primary Examiner

W. J. GOODLIN, Assistant Examiner

U.S. Cl. X.R.

60—52; 180—79.2